(12) United States Patent
DeWeerdt et al.

(10) Patent No.: US 9,043,233 B2
(45) Date of Patent: May 26, 2015

(54) COMPONENT CONFIGURATION UTILIZING VAGUE SPECIFICATIONS

(75) Inventors: Ronald Harold DeWeerdt, Rochester, MN (US); Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1493 days.

(21) Appl. No.: 11/833,568

(22) Filed: Aug. 3, 2007

(65) Prior Publication Data
US 2009/0037714 A1 Feb. 5, 2009

(51) Int. Cl.
*G06Q 10/08* (2012.01)
*G06F 9/44* (2006.01)

(52) U.S. Cl.
CPC .................................... *G06F 8/36* (2013.01)

(58) Field of Classification Search
CPC ............................ G06Q 30/0621; G06F 17/50
USPC ................................................ 713/1; 705/28
See application file for complete search history.

(56) References Cited

U.S. PATENT DOCUMENTS

| | | | |
|---|---|---|---|
| 4,589,063 A | | 5/1986 | Shah et al. |
| 4,870,591 A | | 9/1989 | Cicciarelli et al. |
| 5,257,387 A | | 10/1993 | Richek et al. |
| 5,265,238 A | | 11/1993 | Canova, Jr. et al. |
| 5,500,802 A | * | 3/1996 | Morris et al. ............... 700/182 |
| 5,515,524 A | | 5/1996 | Lynch et al. |
| 5,870,719 A | | 2/1999 | Maritzen et al. |
| 6,161,052 A | * | 12/2000 | Charlton et al. ............... 700/97 |
| 6,226,692 B1 | | 5/2001 | Miloushev et al. |
| 6,247,128 B1 | | 6/2001 | Fisher et al. |
| 6,701,379 B1 | * | 3/2004 | Urquizo et al. ............... 709/250 |
| 6,937,913 B2 | | 8/2005 | Nishikawa et al. |
| 7,140,013 B2 | * | 11/2006 | Te'eni et al. ................. 717/173 |
| 7,475,235 B1 | * | 1/2009 | Bernardy et al. ............... 713/1 |
| 7,565,472 B2 | * | 7/2009 | Cheah et al. ................. 710/300 |

FOREIGN PATENT DOCUMENTS

EP 1178377 A1 2/2002

OTHER PUBLICATIONS

Gentleman et al., "Commercial Realtime Software Needs Different Configuration Management", Proceedings of the 2nd International Workshop on Software configuration management , Princeton, New Jersey, United States, 1989, pp. 152-161.
Luer et al., "WREN—an Environment for Component-Based Development", Proceedings of the 8th European software engineering conference held jointly with 9th ACM SIGSOFT international symposium on Foundations of software engineering, Vienna, Austria , 2001, pp. 207-217.

* cited by examiner

*Primary Examiner* — Kim Huynh
*Assistant Examiner* — Eric Chang
(74) *Attorney, Agent, or Firm* — Yee & Associates, P.C.; Damion Josephs (57) ABSTRACT

A computer implemented method, data processing system, and a computer program product configures components in a data processing system. A request for a vaguely specified component for implementation into a data processing system is received. Responsive to receiving the request, at least one corresponding component is identified. The corresponding component is then displayed to a user for implementation of the corresponding component.

20 Claims, 4 Drawing Sheets

COMPONENT CONFIGURATION UTILIZING VAGUE SPECIFICATIONS

BACKGROUND OF THE INVENTION

1. Field of the Invention

The present invention relates generally to a computer implemented method, data processing system, and a computer program product for configuring data processing systems. More specifically, the present invention relates to a computer implemented method, data processing system, and a computer program product for configuring data processing systems using vaguely defined components.

2. Description of the Related Art

Engineers responsible for building custom data processing systems are constantly concerned with compatibility issues among the various software and hardware components to be installed in the system. In order to aid engineers in their selection of compatible components, system configuration software has been developed. Configuration software works well when the components are easily determinable. When components are known at the time the software is written, compatibility rules, prerequisites and corequisites are easily determined and implemented. A specific rule can be written for each component of the system. An exemplary rule may look like the following:

If OS selected is "LINUX? And "OS specify 20" Feature is available, auto-select, "OS specify 20".

However, as systems get larger, and more complicated, the number of specific rules grows. System engineers developing the configuration software must develop and maintain multiple rules for each component of the system—a task that is compounded in difficulty as the system incorporates additional components. Configuration rules must be modified when old components are replaced with newer releases. Furthermore, there remains the possibility that the auto-select rule may fail if the specified component is unavailable.

BRIEF SUMMARY OF THE INVENTION

A computer implemented method, data processing system, and a computer program product computer implemented method configures components in a data processing system. A request for a vaguely specified component for implementation into a data processing system is received. Responsive to receiving the request, at least one corresponding component is identified. The corresponding component is then displayed to a user for implementation of the corresponding component.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
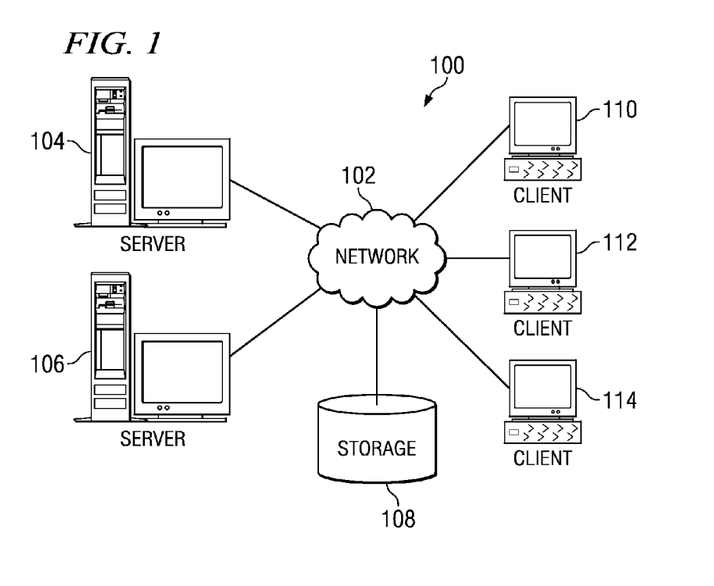
FIG. 1 is a pictorial representation of a network of data processing systems in which an illustrative embodiment may be implemented.
Figure 2:
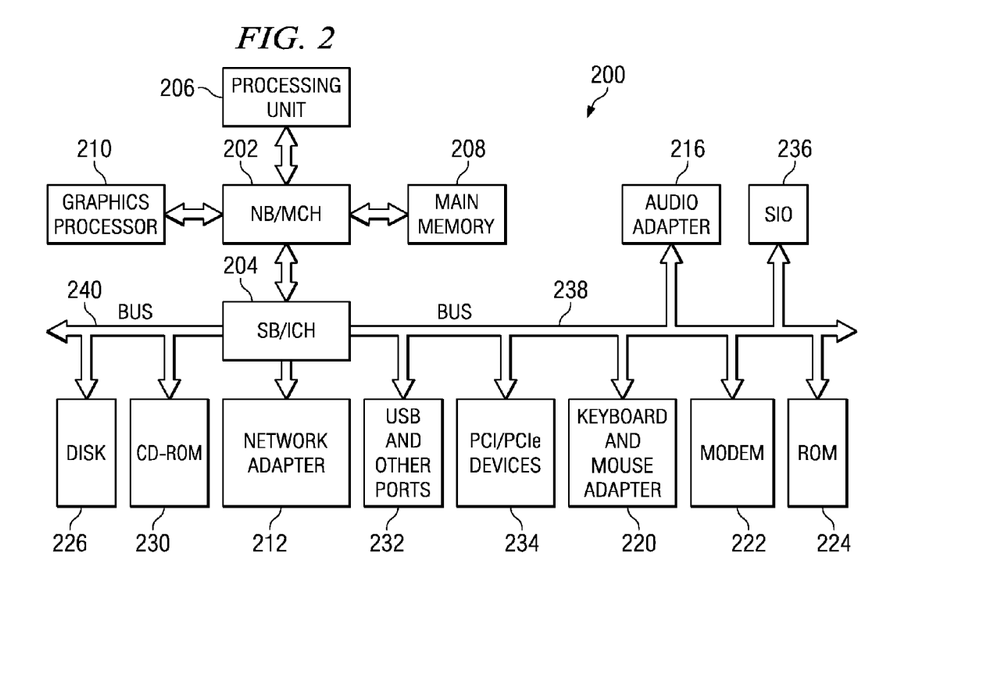
FIG. 2 is a block diagram of a data processing system that may be implemented as a server in accordance an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different embodiments describe a new logic process, including algorithms and strategies for implementation, to configure a set of "vaguely" specified components in a data processing system. The configuration is based on the dynamic context of the current user selections. The present embodiments cover the software function, as well as the specific software signature and error handling.

A "vaguely" specified component is a hardware or software component, including any necessary adapters, drivers, etc., to be implemented into a data processing system. A "vaguely" specified component is defined by characteristics or properties of component. A "vaguely" specified component does not necessarily need to include the make or model number of the component.

Typical of hardware and software sales configuration modeling, a concise definition of the required component is often not known or impossible to obtain. All components may not be available all the time due to availability impediments—either because of the entitlement for a particular customer, country, etc., or because of compatibility issues with other selected components. The modeling engineer may further be unaware of the inventory of available components, as new generation and upgraded components in inventory replace older or outdated components.

By implementing a "vague" specification for each component, additional flexibility for the configuration modeler is facilitated. A multitude of separate rules to handle different configuration contexts can be avoided, improving modeling productivity and maintainability. The "vague" rules provide for easier documentation and understanding by the configuring engineer. The engineer is also provided an ability to set a "soft rule," that need not be failed in all circumstances. Furthermore, the "vague" rules provide additional flexibility to the engineer to specify a range of components to be selected with wild card specifications and associated syntax.

Figure 3:
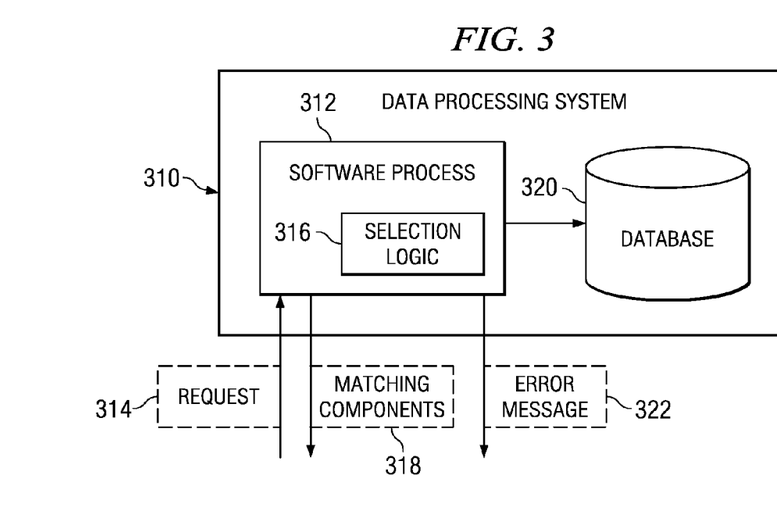
FIG. 3 is a system diagram showing the flow of data through the various parts of a data processing system shown in accordance with illustrative embodiments.

Referring now to FIG. 3, a system diagram showing the flow of data through the various parts of a data processing system is shown in accordance with illustrative embodiments. The data processing system of FIG. 3 can be data processing system 200 of FIG. 2.

Data processing system 310 runs software process 312, which is capable of implementing "soft rules" for the selection of corresponding components, responsive to an engineer selection. Corresponding components are those software or hardware components to be implemented into a data processing system to be built. Corresponding components are those components having characteristics or properties identical to those characteristics or properties identified in the request. Software process 312 vaguely specifies a set of components based on the dynamic context of the current engineer selections. It covers the software function, the specific signature, and error handling for data system 310.

An engineer inputs request 314 into software process 312. Request 314 is a request from an engineer for a corresponding component. Request 314 for a corresponding component can specify a hardware component, such as, but not limited to, a hard drive, network adapter, video card, a bus type, and a motherboard. Similarly, request 314 for a corresponding component can specify a software component, including, but not limited to, a specific operating system, a specific application to be included, as well as any bundled software.

Request 314 can specify the set of components—either by a class name or property value—that need to be considered. Class names are implemented for each broad classification of components. For example, a class name might be "hard drive." This class name would include any available hard drive, regardless of the disk size, revolution speed, etc. As a further example, a class name might be "operating system." An "operating system" class name would include any available operating system that could be implemented into the data processing system, such as Linux®, Windows XP®, and Windows Vista®.

Request 314 includes a class name of requested components, and any requisite properties that the component should have—that is, the request may specify a component based on a class name, a property or value of the component, or by a relationship that is implicitly specified by some logical data. The class is a broad category of general components into which a software or hardware component may be broadly classified. Returning to the example above, for a class name "hard drive," a property might indicate a requisite storage capacity, or spin rate etc.

Request 314 can specify the number of unique components—distinct parts—that should be selected or expanded from the pool of components having a matching class. Request 314 also indicates a distinct part designation. The distinct part designation is an optional input that specifies the number of components that should be selected from the list of components. The distinct part designation can be an integer value, or a range of values. If the distinct part designation is a range of values, i.e., R={R1-R2}, the range is indicated as a minimum/maximum, where the minimum and maximum are each integer values. This range specifies that at least a minimum number of components should be incorporated from the list of valid parts into the final system. The distinct parts number makes it clear that the number of distinct parts indicates the number of different components to be selected, as opposed to being a quantity of the same component to be selected.

A distinct part designation of "zero" indicates that a component is not required, but can be selected if a matching part is otherwise available. A distinct part designation of "*" indicates that a minimum value of "zero" (as defined above) and a maximum value of all components with the matching class and value should be implemented if available.

Request 314 can also specify how many of each of the needed subset of components should be selected or expanded. Responsive to receiving request 314, software process 312 executes selection logic 316 to determine corresponding components 318. Selection logic 316 begins by processing the "distinct parts" input and determining how to translate that given different contexts—that is, selection logic 316 determines how many distinct parts are to be incorporated into the data processing system to be built. The range of "distinct parts" as entered by the engineer is passed to a function. The minimum and maximum are calculated for options to expand taking into account the various possible engineer inputs and component dependencies.

Software process 312 parses component database 320 of available components to determine those of the available components having a matching class to the class indicated in request 314. The component database is a database, such as database 320 of FIG. 3, that contains a listing of available components as well as a listing of each component's properties. A component's properties may include that component's interdependency on other components. The number of available components that have a matching class is defined as a variable. For illustrative purposes, this matching class variable is S1.

Selection logic 316 then eliminates certain those components without those desired properties as indicated in request 314. The group of available components having a matching class and engineer-defined properties is defined as a variable. For illustrative purposes, this matching class and engineer-defined properties variable is S2. If a component in the S1 component class does not have the selected property, that component is removed from the S2 group. Corresponding components 318 is a list of the components that fulfills each prerequisite as well as any properties specified in request 314.

Software process 312 then returns the list of corresponding components 318 identified by selection logic 316 to the engineer. From this, an engineer can determine optimal and corresponding components to incorporate into a new system.

If selection logic 316 determines that not enough unique components are available, or that compatibility issues between the unique components and other selected components would otherwise violate the request 314, process 312 can return an error message 322 to the engineer. Error message 322 indicates to the engineer that none or not enough components complying with request 314 were identified by selection logic 316. The engineer can then reattempt to determine a different component by restarting the corresponding component selection process.

Figure 4:
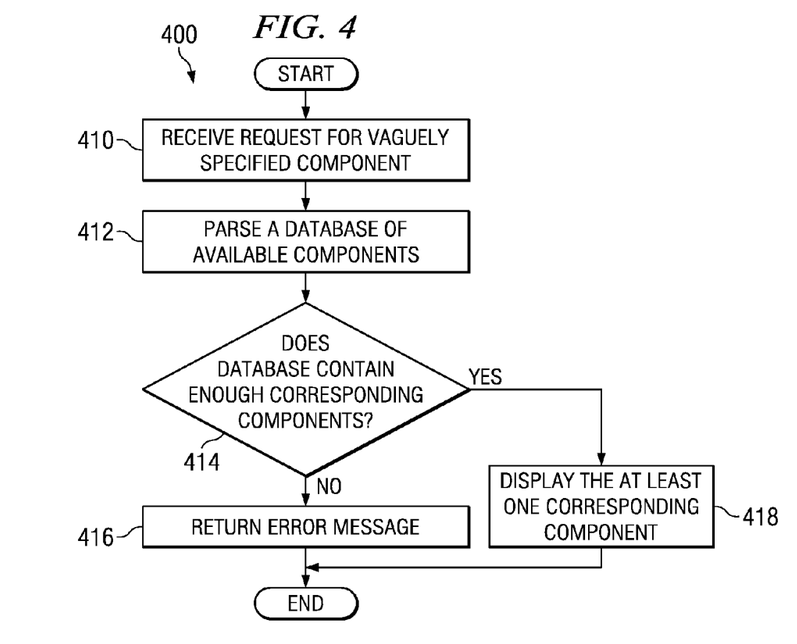
FIG. 4 is a high level block diagram of the processing steps shown in accordance with illustrative embodiments.

Referring now to FIG. 4, a high level block diagram of the processing steps is shown in accordance with illustrative embodiments. Process 400 is a software process, such as process 312 of FIG. 3, executing on a data processing system, such as data processing system 310 of FIG. 3.

Process 400 begins by receiving a request for a vaguely specified corresponding component (step 410). The request includes at least one of a class name or a property. The request can also specify a number of distinct parts that should be incorporated into the data processing machine being configured. The request can also specify a vaguely specified corresponding component by a relationship that is implicitly specified by some logical data.

Responsive to receiving the request, process 400 parses a component database of available components (step 420). The component database is a database, such as database 320 of FIG. 3, that contains a listing of available components as well as a listing of each available component's properties. Similar to the classes and properties indicated in the request, each entry in the database of available component's can include a class name or a property. Each database entry can also specify a number of distinct parts that should be incorporated into the data processing machine being configured. Each database entry can also specify a corresponding component by a relationship that is implicitly specified by some logical data.

Process 400 next compares the list of parsed available components to the vaguely specified component of the request to determine whether the class name or properties specified in the request are identical to any of the class names or properties parsed from the database of available components (step 414). Responsive to determining that the database contains no or not enough corresponding components ("no" at step 414), process 400 returns an error message that not enough corresponding components were found (step 416), with the process terminating thereafter. A configuration engineer may then attempt to select a different component by sending a new request to process 400.

Returning now to step 414, responsive to determining that the database does contains enough corresponding components ("yes" at step 414), process 400 returns and displays a listing of the identified corresponding components (step 418), with the process terminating thereafter. The engineer can then select one or more of the corresponding components for inclusion into the data processing system being configured. Alternatively, process 400 may automatically select corresponding components from the identified corresponding components for inclusion into the data processing system being configured.

Figure 5:
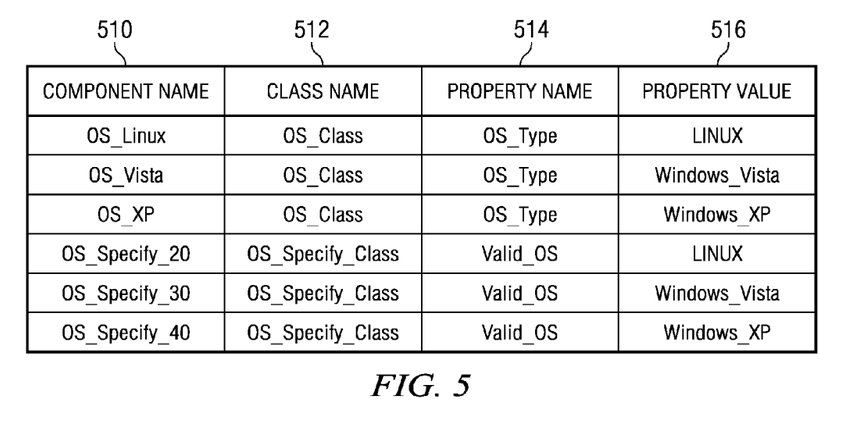
FIG. 5 is an example of a component database shown in accordance with illustrative embodiments.

Referring now to FIG. 5, an example of a component database is shown in accordance with illustrative embodiments. The component database of FIG. 5 can be component database 320 of FIG. 3. "Component Name" 510 lists the names of "vaguely" defined components included in the database. The exemplary component database of FIG. 5 includes various operating systems and software corequisites of those operating systems. Properties of the "vaguely" defined components—"Property Name" 512 and "Property Value" 514 are also indicated.

A request to the data processing system, such as request 314 of FIG. 3, vaguely specifies the set of components—either by a class name 512, property name 514, or property value 516—that should be considered in determining corresponding components. For example, if the request indicates a property value of "Linux", the above vaguely specified rule would dictate that only the corresponding component "OS_Specify_20" component name 510 would be valid in the OS_Specify_Class class name 512. Thus, an engineer configuring the data processing system to be built would also need to include the OS_Specify_20 component when requesting the Linux® operating system.

Given the above components, a "vaguely" specified rule could state that components having a Class Name "OS_Specify_Class" are valid only if the Property Value corresponding to the Property Name "OS_Type" of the operating system selected on the configuration matches the Property Value for the "Valid_OS" property name on the OS_Specify components. For example, if the Linux® operating system is selected, the above vaguely specified rule would dictate that only OS_Specify_20 would be valid in the OS_Specify_Class. In a pseudo-code format, the above defined vaguely specified rule would state:

Select (OS_Specify_Class, <Valid_OS=OS_Class.OS_Type>, Range R={1})

This vaguely specified rule will ensure that the appropriate component from the OS_Specify_Class is selected. The appropriate component will be the one that has the correct value for the Valid_OS property which matches the OS_Type property of the OS selection.

Figure 6:
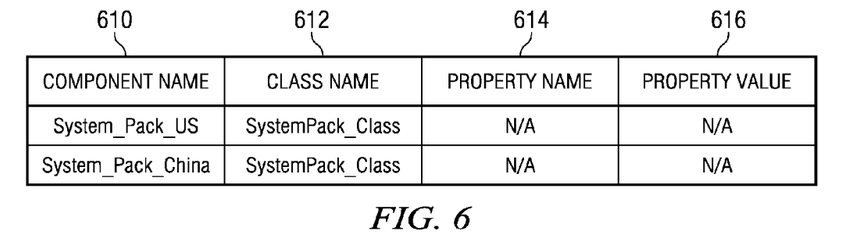
FIG. 6 is an example of a component database shown in accordance with illustrative embodiments.

Referring now to FIG. 6, an example of a component database is shown in accordance with illustrative embodiments. The component database of FIG. 6 can be component database 320 of FIG. 3. "Component Name" 610 lists the names of "vaguely" defined components included in the database. In the exemplary component database of FIG. 6, the "SystemPack_Class" Class Name 612 has been filtered based on the selected country to which the data processing system will eventually be provided. The "SystemPack_Class" Class Name 612 may be data that is provided from an external source so it is neither a property name 614 nor a property value 616 of the component itself, thus the 'N/A' for the property in this example.

A request to the data processing system, such as request 314 of FIG. 3, vaguely specifies the set of components—either by a class name 612, property name 614, or property value 616—that should to be considered in determining corresponding components. For example, if the request indicates that 'US' is the country the configuration, an exemplary vaguely specified rule would dictate that only the corresponding component "System_Pack_US" component name 610 would be valid in the SystemPack_Class class name 612. Thus, an engineer configuring the data processing system to be built would also need to include the System_Pack_US component when "US" is the country to which the data processing system will eventually be provided.

Given the above components, a "vaguely" specified rule could state that the appropriate Component Name 610 will be the one that is valid in the selected country. By way of example, if 'US' is the country the configuration is being generated for, then only System_Pack_US will be valid. In a pseudo-code format, the above defined vaguely specified rule would state:

Select (SystemPack_Class, Range R={1})

This rule will ensure that the appropriate component name 610 from the SystemPack_Class class name 612 is selected. The appropriate component name 610 will be the one that is valid in the selected country.

Figure 7:
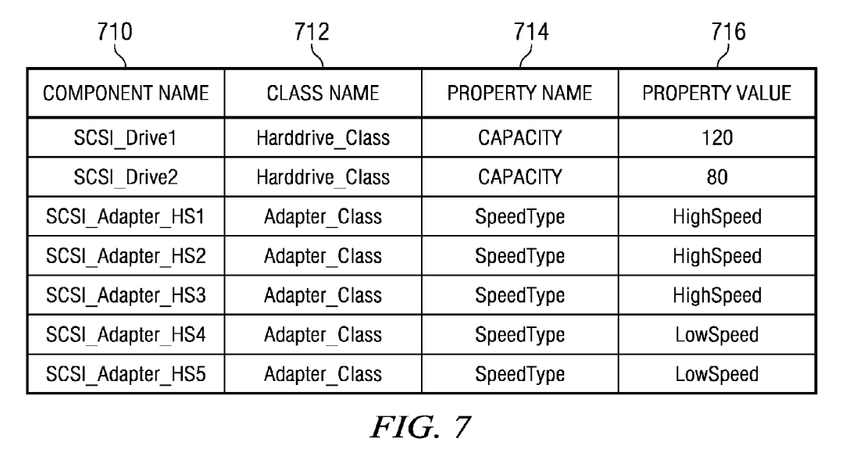
FIG. 7 is an example of a component database shown in accordance with illustrative embodiments.

Referring now to FIG. 7, an example of a component database is shown in accordance with illustrative embodiments. The component database of FIG. 7 can be component database 320 of FIG. 3. "Component Name" 710 lists the names of "vaguely" defined components included in the database. The exemplary hard drive storage devices and the adapter corequisites of those hard drive storage devices. Properties of the "vaguely" defined components—"Property Name" 714 and "Property Value" 716 are also indicated.

In the exemplary component database of FIG. 7, the "Harddrive_Class" and "Adapter_Class" Class Names 712 have been filtered based on a desired hardware component ("Harddrive_Class" class name 712), and the necessary adapters that could be used to implement that hardware component into the data processing system to be built ("Adapter_Class" class name 712). As shown, the database indicates each hard drive and adapter contained in inventory, regardless of any properties specified by a request.

A request to the data processing system, such as request 314 of FIG. 3, vaguely specifies the set of components—either by a class name 712, property name 714, or property value 716—that should to be considered in determining corresponding components. For example, if the request indicates that a class name 712 "Harddrive_Class" component is selected, and that the selected "Harddrive_Class" component has a property value 716 of a storage capacity greater than or equal to "120," then up to 2 components from the "Adapter_Class" Class Name 712 which have a property name 714 of "SpeedType" and a property value 716 of "High-Speed" should be selected. Thus, an engineer configuring the data processing system to be built would need to include up to 2 components from the "Adapter_Class" Class Name 712 which have a property name 714 of "SpeedType" and a property value 716 of "High-Speed" if the "Harddrive_Class" component has a property value 716 of a storage capacity greater than or equal to "120".

Given the above components, a "vaguely" specified rule could state that if a "Harddrive_Class" Class Name component is selected that has a property value of a storage capacity greater than or equal to "120," then up to 2 components from the "Adapter_Class" Class Name which have a property name of "SpeedType" and a property value of "High-Speed" should be selected. In a pseudo-code format, the above defined vaguely specified rule would state:

If the selected component in the Hardrive_Class has Capacity >= 120, then Select (Adapter_Class, < SpeedType= HighSpeed>, Range R = {1-2})

Note that this rule will only be active if the selected SCSI_Drive component is SCSI_Drive1. With this exemplary rule, the "Adapter_Class" Class Name will be subset to only those components that have both a "SpeedType" Property Name and a "High-Speed" Property Value. This set of "Adapter_Class" Class Name would include only the SCSI_Adapter_HS1, the SCSI_Adapter_HS2 and the SCSI_Adapter_HS3.

Note also that, with the range of '1-2' specified, this rule requires that at least one of the identified components (SCSI_Adapter_HS1, SCSI_Adapter_HS2 or SCSI_Adapter_HS3) must be selected. However, no more than two of the identified components can be selected. Because more components were identified than are required, the exemplary rule will select the first two identified components in the subset.

Figure 8:
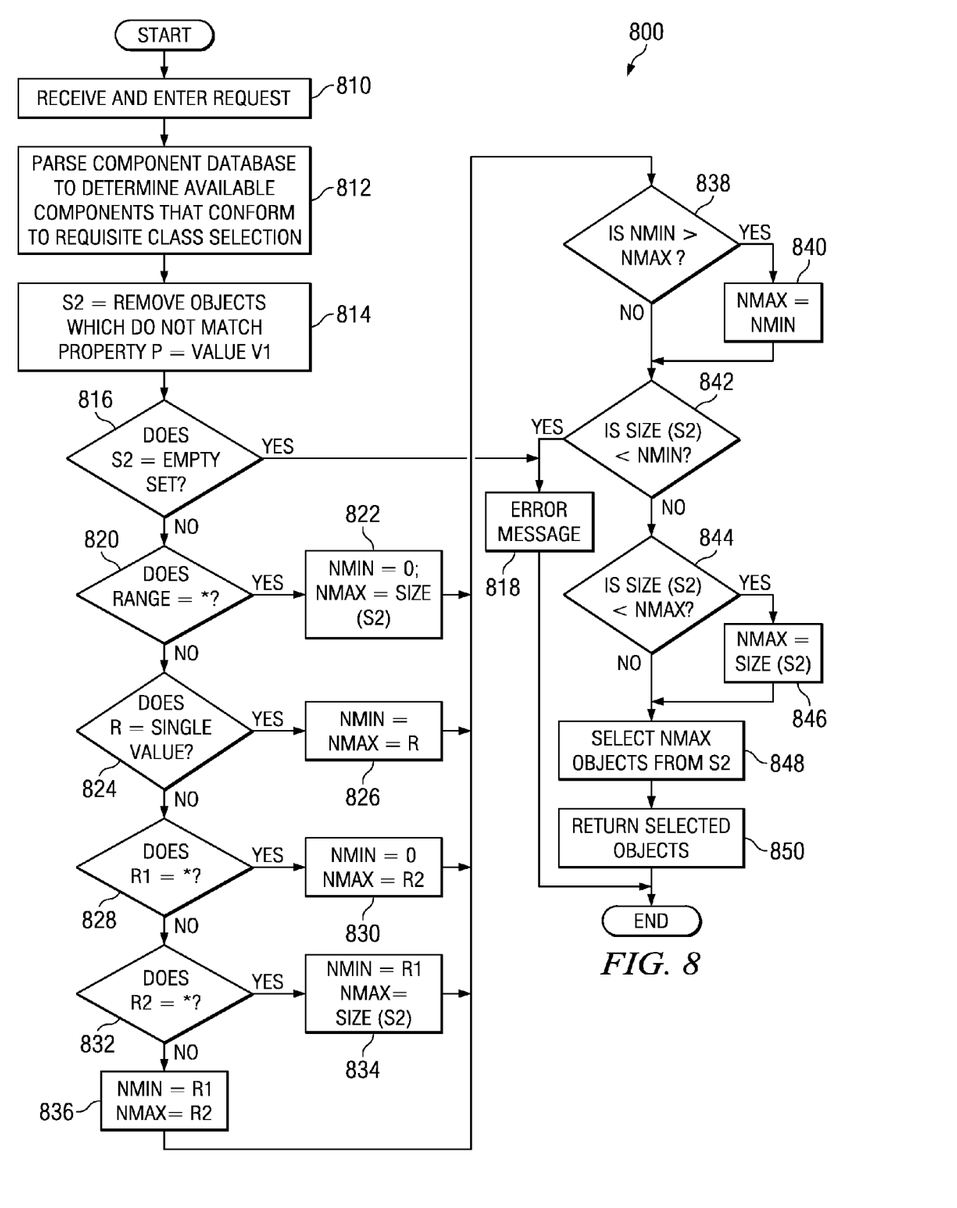
FIG. 8 is a block diagram of the processing steps shown in accordance with illustrative embodiments.

Referring now to FIG. 8, a block diagram of the processing steps is shown in accordance with illustrative embodiments. Process 800 is a software process, such as process 312 of FIG. 3, executing on a data processing system, such as data processing system 310 of FIG. 3.

Process 800 begins by receiving a request for a component having certain values and properties (step 810). The values and properties in the request correspond to the class names and properties contained in a component database, such as component database 320 of FIG. 3 and those component databases identified in the preceding examples. A component may be a software component or a hardware component. The request includes a class of requested components, and any requisite properties that the component should have.

The request also indicates a distinct part designation. The distinct part designation is an optional input that specifies the number of components that should be selected from the list of components. The distinct part designation can be an integer value, or a range of values.

If the distinct part designation is a range of values, i.e., R={R1-R2}, the range is indicated as a minimum/maximum, where the minimum and maximum are each integer values. This range specifies that at least a minimum number of components should be incorporated from the list of valid parts into the final system. A distinct part designation of "zero" indicates that a component is not required, but can be selected if a matching part is otherwise available. A distinct part designation of "*" indicates that a minimum value of "zero" (as defined above) and a maximum value of all components with the matching class and value should be implemented if available. As a line of pseudo-code, the input at step 810 can be represented as:

Select (Classes cls, <property p=value v1>, Range R={R1-R2})

Responsive to process 800 receiving the class, value, and distinct part designations from the engineer, process 800 parses a component database of available components to determine those of the available components that conform to the requisite class selection (step 812). The component database is a database, such as database 320 of FIG. 3, that contains a listing of available components as well as a listing of each component's properties. A component's properties may include that component's interdependency on other components, or any physical features or limitations of the component. The list of available components having a matching class is defined as a variable. For illustrative purposes, this matching class variable is S1. As a line of pseudo-code, the input at step 812 can be represented as:

S1=Read all valid object classes cls.

Process 800 now begins to eliminate certain objects from the object class that do not have the desired properties (step 814). If an object in the S1 object class does not have the selected property, that object is removed from the S2 group. After process 800 reads each valid object class, process 800 removes from the S1 group those components that do not possess the requisite properties for the component, as identified in the engineer input. The group of available components having a matching class and engineer-defined properties is defined as a variable. For illustrative purposes, this matching class and engineer-defined properties variable is S2. This group of S2=Remove objects which do not match property p=value v1 (step 814). As a line of pseudo-code, the operation at step 814 can be represented as:

S2=S1−non-matching property objects

Process 800 next determines whether the set S2 is an empty set (step 816). If none of the S1 components contain the requisite p property, then each component of S1 is a non-matching p component. When each component of S1 is determined to be a non-matching p component, no corresponding component conforming to the engineer's selection is available. Solving for the above equation, each of S1 is a non-matching p object (i.e., S1=non-matching property objects), so that the set S2 is an empty set and does not contain any corresponding components. Responsive to S2 being identified as an empty set ("yes" at step 816), process 800 returns an error message to the engineer that no sufficient objects were found (step 818), with the process terminating thereafter. The engineer can then reattempt to determine a different component by restarting the corresponding component selection process.

Returning now to step 816, if set S2 is not an empty set ("no" at step 816), that is, there is at least one matching p object and therefore at least one corresponding component, process 800 next determines if the distinct part designation Range R is equal to "*" (step 820). A distinct part designation of "*" indicates that a minimum value of "zero" (as defined above) and a maximum value of all components with the matching class and value should be implemented if available. If process 800 determines that the range R is equal to "*" ("yes" at step 820), process 800 sets both variables for the minimum number of components (Nmin) equal to 0, and the maximum number of components (Nmax) equal to the size of the S2 set (step 822). Process 800 then proceeds to step 838 for further processing. As a line of pseudo-code, the operation at step 822 can be represented as:

Nmin=0; Nmax=size(S2)

Responsive to process 800 determining that distinct part designation range R is not equal to "*" ("no" at step 820), process 800 next determines whether the distinct part designation range R is a single value (step 824). If process 800 determines that the range R is a single value ("yes" at step 824), process 800 sets the minimum number of components (Nmin), and the maximum number of components (Nmax) equal to R (step 826). Process 800 then proceeds to step 838 for further processing. As a line of pseudo-code, the operation at step 826 can be represented as:

Nmin=Nmax=Range(R)

Responsive to process 800 determining that range R is not a single number ("no" at step 824), process 800 next determines whether the lower bound of the range R (R1) is equal to "*" (step 828). If process 800 determines that R1 is equal to "*" ("yes" at step 828), process 800 sets the minimum number of components (Nmin) equal to 0, and the maximum number of components (Nmax) equal to the upper bound of the range R (R2) (step 830). Process 800 then proceeds to step 838 for further processing. As a line of pseudo-code, the operation at step 830 can be represented as:

Nmin=1; Nmax=R2

Returning to step 828, responsive to process 800 determining that R1 is not equal to "*" ("no" at step 828), process 800 next determines whether the upper bound of the range R (R2) is equal to "*" (step 832). If process 800 determines that R2 is equal to "*" ("yes" at step 832), process 800 sets the minimum number of components equal to the lower bound of the range R (R1), and the maximum number of components equal to the number of components with matching p properties (size(S2)) (step 834). Process 800 then proceeds to step 838 for further processing. As a line of pseudo-code, the operation at step 834 can be represented as:

Nmin=R1; Nmax=size(S2)

Returning now to step 832, if process 800 determines that R2 is not equal to * ("no" at step 832), process 800 sets the minimum number of components (Nmin) equal to the lower bound of the range R (R1), and the maximum number of components (Nmax) equal to the upper bound of the range R (R2) (step 836). Process 800 then proceeds to step 838 for further processing. As a line of pseudo-code, the operation at step 836 can be represented as:

Nmin=R1; Nmax=R2

Referring now to step 838, process 800 next determines whether minimum number of components (Nmin) is greater than the maximum number of components (Nmax) (step 838). If process 800 determines that Nmin is greater than Nmax ("yes" at step 838), process 800 sets the variable Nmax equal to Nmin (step 840). Process 800 then proceeds to step 842 for further processing. If process 800 determines that Nmin is less than or equal to Nmax—i.e., Nmin is greater than Nmax ("no" at step 838), process 800 proceeds directly to step 842 for further processing.

Process 800 next determines whether size (S2) is less than Nmin (step 842). If process 800 determines that size(S2) is less than Nmin ("yes" at step 842), not enough matching hardware is available, and process 800 proceeds to step 818 and returns an error message to the engineer that no sufficient objects were found (step 818), with the process terminating thereafter. The engineer can then reattempt to determine a different part by restarting the matching hardware selection process.

Referring back to step 842, if process 800 determines that graphic command data 317 size(S2) is not less than Nmin—i.e., size(S2) is greater than or equal to Nmin—("no" at step 842), process 800 next determines when size(S2) is less than Nmax (step 844). Responsive to determining that size(S2) is less than Nmax ("yes" at step 844), process 800 sets the variable Nmax equal to size(S2) (step 846). Process 800 then proceeds to step 848 for further processing. If process 800 determines that size(S2) is not less than Nmax—i.e., size(S2) is greater than or equal to Nmax—("no" at step 844), process 800 proceeds directly to step 848 for further processing.

Referring now to step 848, process 800 now selects Nmax objects from S2 (step 848).

Responsive to selecting Nmax objects from S2, process 800 returns the selected objects to the engineer (step 850), with the process terminating thereafter. The engineer can then choose one of the selected objects to implement into the hardware device.

The invented method, data processing system, and a computer program product can also be implemented as a configuration tool to an end user. The user could select various components for implementation into a data processing system. The present embodiments would guild the user in selecting compatible components. This embodiment could be implemented as a web site, or as a stand alone kiosk.

Thus, the present embodiments provide a computer implemented method, data processing system, and a computer program product for configuring components in a data processing system. The present embodiments describe a new logic process, including algorithms and strategies for implementation, to configure a set of "vaguely" specified components in a data processing system. The configuration is based on the dynamic context of the current user selections. The present embodiments cover the software function, as well as the specific software signature and error handling.

Typical of hardware and software sales configuration modeling, a concise definition of the required component is often not known or impossible to obtain. All components may not be available all the time due to availability impediments—either because of the entitlement for a particular customer, country, etc., or because of compatibility issues with other selected components. The modeling engineer may further be unaware of the inventory of available components, as new generation and upgraded components in inventory replace older or outdated components.

By implementing a "vague" specification for each component, additional flexibility for the configuration modeler is facilitated. A multitude of separate rules to handle different configuration contexts can be avoided, improving modeling productivity and maintainability. The "vague" rules provide for easier documentation and understanding by the configuring engineer. Furthermore, the engineer is provided the ability to set a "soft rule," that need not be failed in all circumstances. Furthermore, the "vague" rules provide additional flexibility to the engineer to specify a range of components to be selected with wild card specifications and associated syntax.

The embodiments can take the form of an entirely hardware embodiment, an entirely software embodiment or an embodiment containing both hardware and software elements. In a preferred embodiment, the embodiments are implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present embodiments have been presented for purposes of illustration and description, and is not intended to be exhaustive or limited to the embodiments in the form disclosed. Many modifications and variations will be apparent to those of ordinary skill in the art. The embodiment was chosen and described in order to best explain the principles of the embodiments, the practical application, and to enable others of ordinary skill in the art to understand the invention for various embodiments with various modifications as are suited to the particular use contemplated.

What is claimed is:

1. A computer implemented method for configuring components for assembly within a data processing system comprising:
    receiving a request for a vaguely specified component from an inventory of available components for implementation into the data processing system, wherein the request includes a class of the vaguely specified component, a property of the vaguely specified component, and a distinct part designation of the vaguely specified component, wherein the distinct part designation is a range indicating a minimum number of the at least one corresponding component and a maximum number of the at least one corresponding component to incorporate into the data processing system, wherein the minimum number of the at least one corresponding component indicates that the at least one corresponding component is not required, but can be selected if the at least one corresponding component is otherwise available, wherein the maximum number of the at least one corresponding component is equal to a total number of the at least one corresponding component identified, wherein the request identifies the vaguely specified component by a characteristic of the vaguely specified component, a property of the vaguely specified component, or a combination thereof, but does not include a make number of the vaguely specified component or a model number of the vaguely specified component;
    responsive to receiving the request, identifying at least one corresponding component from the inventory of available components for implementation into a data processing system, wherein the at least one corresponding component matches the characteristic of the vaguely specified component, the property of the vaguely specified component, or the combination thereof; and
    displaying the at least one corresponding component.

2. The computer implemented method of claim 1, wherein the step of identifying at least one corresponding component comprises parsing a database of all available components.

3. The computer implemented method of claim 2, wherein the step of identifying at least one corresponding component further comprises:
    comparing a class of the vaguely specified component to a list of component classes contained in the database, and
    comparing a property of the vaguely specified component to a list of properties contained in the database, wherein the at least one corresponding component is identified if either the class of the vaguely specified component matches a class entry in the list of component classes, or the property of the vaguely specified component matches a property entry in the list of properties contained in the database.

4. The computer implemented method of claim 2, wherein the request includes a first class of the vaguely specified component and a first property of the vaguely specified component; and wherein the database of all available components comprises a second class and a second property; and wherein the at least one corresponding component is identified from the database of all available components based on matching the first class to the second class, and matching the first property to the second property.

5. The computer implemented method of claim 1, wherein the vaguely specified component is selected from the group consisting of, a hard drive, a network adapter, a video card, a bus type, and a motherboard.

6. A computer program product comprising:
    a non-transitory computer usable readable storage medium having computer usable program code for configuring components for assembly within a data processing system, the computer program product comprising:
    computer usable program code for receiving a request for a vaguely specified component from an inventory of available components for implementation into a data processing system, wherein the request includes a class of the vaguely specified component, a property of the vaguely specified component, and a distinct part designation of the vaguely specified component, wherein the distinct part designation is a range indicating a minimum number of the at least one corresponding component and a maximum number of the at least one corresponding component to incorporate into the data processing system, wherein the minimum number of the at least one corresponding component indicates that the at least one corresponding component is not required, but can be selected if the at least one corresponding component is otherwise available, wherein the maximum number of the at least one corresponding component is equal to a total number of the at least one corresponding component identified, wherein the request identifies the vaguely specified component by a characteristic of the vaguely specified component, a property of the vaguely specified component, or a combination thereof, but does not include a make number of the vaguely specified component or a model number of the vaguely specified component;
    computer usable program code, responsive to receiving the request, for identifying at least one corresponding component from the inventory of available components for implementation into a data processing system, wherein the at least one corresponding component matches the characteristic of the vaguely specified component, the property of the vaguely specified component, or the combination thereof; and computer usable program code, responsive to identifying the at least one corresponding component, for displaying the at least one corresponding component.

7. The computer program product of claim 6, wherein the computer usable program code for identifying at least one corresponding component comprises parsing a database of all available components.

8. The computer program product of claim 7, wherein the computer usable program code identifying at least one corresponding component further comprises comparing a class of the vaguely specified component to a list of component classes contained in the database, and comparing a property of the vaguely specified component to a list of properties contained in the database, wherein the at least one corresponding component is identified if either the class of the vaguely specified component matches a class entry in the list of component classes, or the property of the vaguely specified component matches a property entry in the list of properties contained in the database.

9. The computer program product of claim 6, wherein the request includes a first class of the vaguely specified component and a first property of the vaguely specified component; and wherein the database of all available components comprises a second class and a second property; and wherein the at least one corresponding component is identified from the database of all available components based on matching the first class to the second class, and matching the first property to the second property.

10. A data processing system comprising:
a bus;
a communications unit connected to the bus;
a storage device connected to the bus, wherein the storage device includes computer usable program code; and
a processor unit connected to the bus, wherein the processor unit executes the computer usable program to receive a request for a vaguely specified component from an inventory of available components for implementation into the data processing system, wherein the request includes a class of the vaguely specified component, a property of the vaguely specified component, and a distinct part designation of the vaguely specified component, wherein the distinct part designation is a range indicating a minimum number of the at least one corresponding component and a maximum number of the at least one corresponding component to incorporate into the data processing system, wherein the minimum number of the at least one corresponding component indicates that the at least one corresponding component is not required, but can be selected if the at least one corresponding component is otherwise available, wherein the maximum number of the at least one corresponding component is equal to a total number of the at least one corresponding component identified, wherein the request identifies the vaguely specified component by a characteristic of the vaguely specified component, a property of the vaguely specified component, or a combination thereof, but does not include a make number of the vaguely specified component or a model number of the vaguely specified component, responsive to receiving the request, identify at least one corresponding component from the inventory of available components for implementation into a data processing system, wherein the at least one corresponding component matches the characteristic of the vaguely specified component, the property of the vaguely specified component, or the combination thereof.

11. The data processing system of claim 10, wherein the step of identifying at least one corresponding component comprises parsing a database of all available components.

12. The data processing system of claim 11, wherein the step of identifying at least one corresponding component further comprises comparing a class of the vaguely specified component to a list of component classes contained in the database, and comparing a property of the vaguely specified component to a list of properties contained in the database, wherein the at least one corresponding component is identified if either the class of the vaguely specified component matches a class entry in the list of component classes, or the property of the vaguely specified component matches a property entry in the list of properties contained in the database.

13. The data processing system of claim 11, wherein the request includes a first class of the vaguely specified component and a first property of the vaguely specified component; and wherein the database of all available components comprises a second class and a second property; and wherein the at least one corresponding component is identified from the database of all available components based on matching the first class to the second class, and matching the first property to the second property.

14. A computer implemented method for configuring components in a data processing system comprising:
receiving a request for a vaguely specified component from an inventory of available components for implementation into a data processing system, the request comprising a first class of the vaguely specified component, a first property of the vaguely specified component, and a first distinct part designation of the vaguely specified component, wherein the distinct part designation is a range indicating a minimum number of the at least one corresponding component and a maximum number of the at least one corresponding component to incorporate into the data processing system, wherein the minimum number of the at least one corresponding component indicates that the at least one corresponding component is not required, but can be selected if the at least one corresponding component is otherwise available, wherein the maximum number of the at least one corresponding component is equal to a total number of the at least one corresponding component identified;
parsing a list of available components from the inventory of available components for implementation into a data processing system, each of the available components including one of a group of classes and at least one of a group or properties;
identifying at least one of available components from the list of available components, wherein the at least one of a group of classes matches the first class and at least one of a group or properties matches the first property; and
displaying the at least one available component.

15. The computer implemented method of claim 14, wherein identifying at least one of available component from the list of available components includes including those of the available components, having a second class of the group of classes that matches the first class, in a first group.

16. The computer implemented method of claim 15, wherein the step of identifying at least one of available components from the list of available components includes excluding components of the first group, having a second property of the group of properties that does not match the first property, from a second group.

17. A computer program product in a non-transitory computer readable storage medium for configuring components in a data processing system comprising:

first instructions for receiving a request for a vaguely specified component from an inventory of available components for implementation into a data processing system, the request comprising a first class of the vaguely specified component, a first property of the vaguely specified component, and a first distinct part designation of the vaguely specified component, wherein the distinct part designation is a range indicating a minimum number of the at least one corresponding component and a maximum number of the at least one corresponding component to incorporate into the data processing system, wherein the minimum number of the at least one corresponding component indicates that the at least one corresponding component is not required, but can be selected if the at least one corresponding component is otherwise available, wherein the maximum number of the at least one corresponding component is equal to a total number of the at least one corresponding component identified;

second instructions for parsing a list of available components from the inventory of available components for implementation into a data processing system, each of the available components including one of a group of classes and at least one of a group or properties;

third instructions for identifying at least one of available component from the list of available components wherein the at least one of a group of classes matches the first class and at least one of a group or properties matches the first property; and fourth instructions for displaying the at least one available component.

18. The computer program product of claim 17, wherein the third instructions include including those of the available components, having a second class of the group of classes that matches the first class, in a first group.

19. The computer program product of claim 18, wherein the third instructions include excluding components of the first group, having a second property of the group of properties that does not match the first property, from a second group.

20. The computer program product of claim 19, wherein the first distinct part designation is a range indicating a minimum number of the at least one corresponding component and a maximum number of the at least one corresponding component to incorporate into the data processing system, the computer implemented method further comprising verifying that the second group falls within the range.

* * * * *